United States Patent [19]

Kitterman

[11] 3,994,437
[45] Nov. 30, 1976

[54] BROADCAST DISSEMINATION OF TRACE QUANTITIES OF BIOLOGICALLY ACTIVE CHEMICALS

[75] Inventor: Roger L. Kitterman, Tonopah, Ariz.

[73] Assignee: Albany International Corporation, Albany, N.Y.

[22] Filed: Sept. 19, 1975

[21] Appl. No.: 615,062

[52] U.S. Cl. .............................. 239/1; 47/DIG. 4; 239/142; 239/171; 239/172; 239/654
[51] Int. Cl.² ................... A01C 15/04; B05B 17/02
[58] Field of Search .............. 71/64 B, 64 DB, 64 F, 71/64 G; 47/1, 9, 48.5, 57.6, DIG. 4, DIG. 9; 111/1, 10, DIG. 1; 239/1, 8, 9, 10, 142, 148, 171, 172, 654, 655; 424/32–37

[56] References Cited
UNITED STATES PATENTS

| | | | |
|---|---|---|---|
| 1,785,932 | 12/1930 | Brown et al. | 239/654 X |
| 2,986,360 | 5/1961 | Rutten | 239/171 X |
| 3,539,465 | 11/1970 | Hiestand et al. | 424/33 X |
| 3,577,515 | 3/1971 | Vandegaer | 424/32 |

*Primary Examiner*—Evon C. Blunk
*Assistant Examiner*—Andres Kashnikow
*Attorney, Agent, or Firm*—Drummond, Nelson & Ptak

[57] ABSTRACT

A method and apparatus are provided for evenly disseminating by broadcast techniques trace quantities of biologically active chemicals such as nutrients, insecticides, fungicides, growth regulators and the like. The biologically active chemical is encapsulated in a microdispenser such as a filamentary conduit of regulated cross-section and length. The filled microdispensers are then metered into a moving carrier fluid stream, preferably air, and the carrier fluid containing the microdispensers is then evenly dispensed throughout the area. In an alternate preferred embodiment, the microdispensers are coated with a second material which may be either another biologically active material or a sticker for attaching the microdispenser to living organisms such as plants or animals. The method and apparatus is also applicable to biologically active chemicals contained in laminated microdispenser structures for dissemination and release.

5 Claims, 11 Drawing Figures

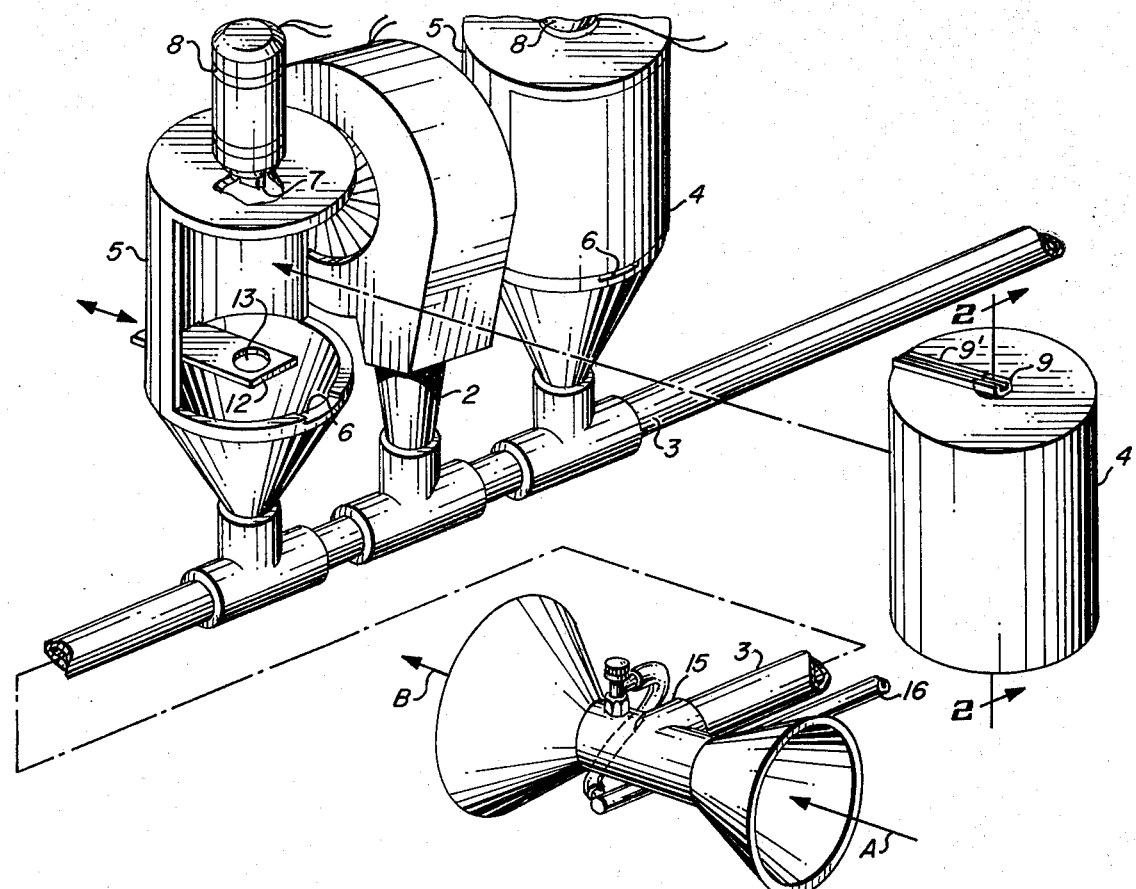
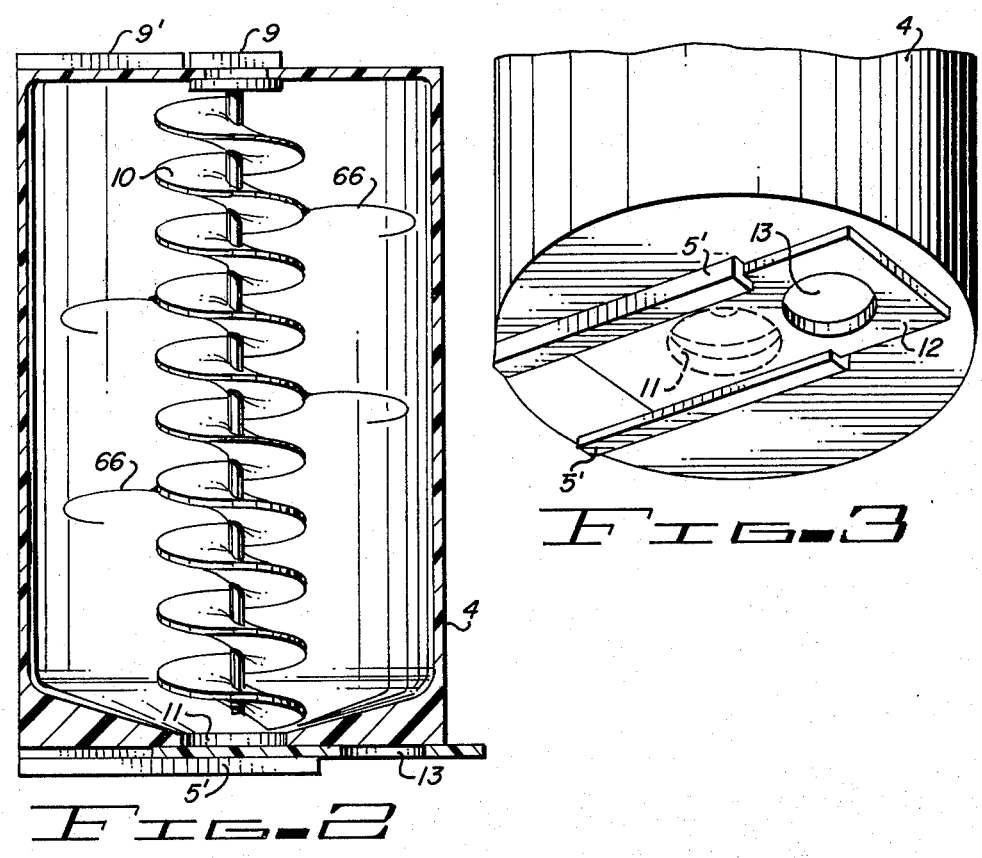

BROADCAST DISSEMINATION OF TRACE QUANTITIES OF BIOLOGICALLY ACTIVE CHEMICALS

This invention relates to methods and apparatus for evenly disseminating trace quantities of biologically active chemicals over wide areas.

More particularly, the invention concerns methods and apparatus for disseminating such chemicals by broadcast techniques.

In a more particular respect, the invention relates to methods and apparatus for broadcast dissemination of trace quantities of biologically active materials, which methods and apparatus are specially adapted for use in disseminating such chemicals from moving vehicles, such as aircraft or land vehicles.

In still another and even more specific respect, the invention relates to broadcast simultaneous dissemination of two or more biologically active chemicals.

In a still further and specific respect, the invention relates to broadcast dissemination of biologically active chemicals which are contained within a microdispenser.

For many years, various biologically active chemicals, such as insecticides, fungicides, herbicides, fertilizers, etc., have been disseminated by broadcast techniques over large areas of crop lands, forests, etc. The application rate of these biologically active chemicals was relatively large, sometimes measured in several hundreds of pounds per acre. Consequently, it was not necessary that the methods and apparatus be specially adapted to evenly disseminating precisely measured very small quantities of chemicals over very wide areas.

However, more recently the need for a method and apparatus for very accurately disseminating minute quantities of biologically active chemicals over wide areas has become acute.

Illustratively, insect pheromones have been discovered which elicit highly specific responses in specific insect species. These pheromones may serve as alarm signals, food finding aids, mating signals, trail markers or defensive agents for warding off predators. Thus, the behavior of various insect species can be effectively regulated by providing an appropriate pheromone at an appropriate location in a crop field or other large geographical area. For example, the pheromone "gossyplure", an attractant for the female pink bollworm moth, can be effectively employed to disrupt the natural mating cycle of the pink bollworm for up to 2-3 weeks when applied in a quantity as small as one gram per acre. However, until now, no successful method has been devised for accurately and evenly disseminating such trace quantities of material over such a large area. It would, therefore, be highly desirable to provide a method and apparatus useful therein for evenly and accurately dispensing and disseminating minute quantities of biologically active materials such as insect pheromones over very large areas, both to increase the effectiveness of the chemical and to reduce quantities of the chemicals required to obtain a given effect.

Accordingly, the principal object of the present invention is to provide methods and apparatus for accurately and evenly disseminating biologically active materials over large surface areas of crop lands, forests and the like.

Another object of the invention is to provide such methods and apparatus which are specially adapted to dissemination of biologically active chemicals as a plurality of "point sources" to be located in more or less uniformly spaced locations throughout the area in question.

Still another important object of the invention is to provide a method for disseminating one biologically active chemical as evenly spaced point sources and to simultaneously provide a second biologically active material in the locus of each of said point sources.

Yet another important and more specific object of the invention is to provide methods and apparatus for disseminating a biologically active chemical as a plurality of point sources, which point sources are physically attached to living organisms such as plants or animals located within the area.

These and other further and more specific objects and advantages of the invention will become apparent from the following detailed description thereof, taken in conjunction with the drawings, in which:

FIG. 1 is a perspective view of dispensing apparatus embodying the present invention, which is adapted for installation in an aircraft;

FIG. 2 is a cross-sectional view of the canister in which the biologically active chemical is temporarily stored in the apparatus of FIG. 1, taken along section line 2—2 of FIG. 1;

Figure 4:
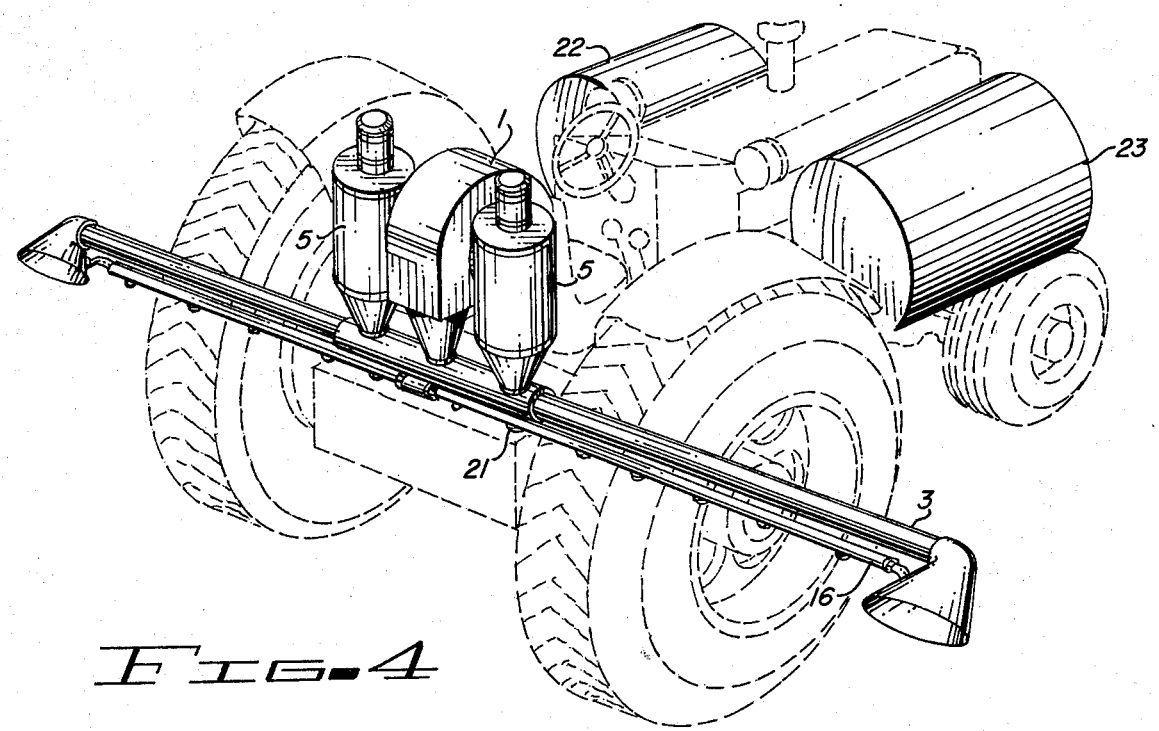
Figure 5:
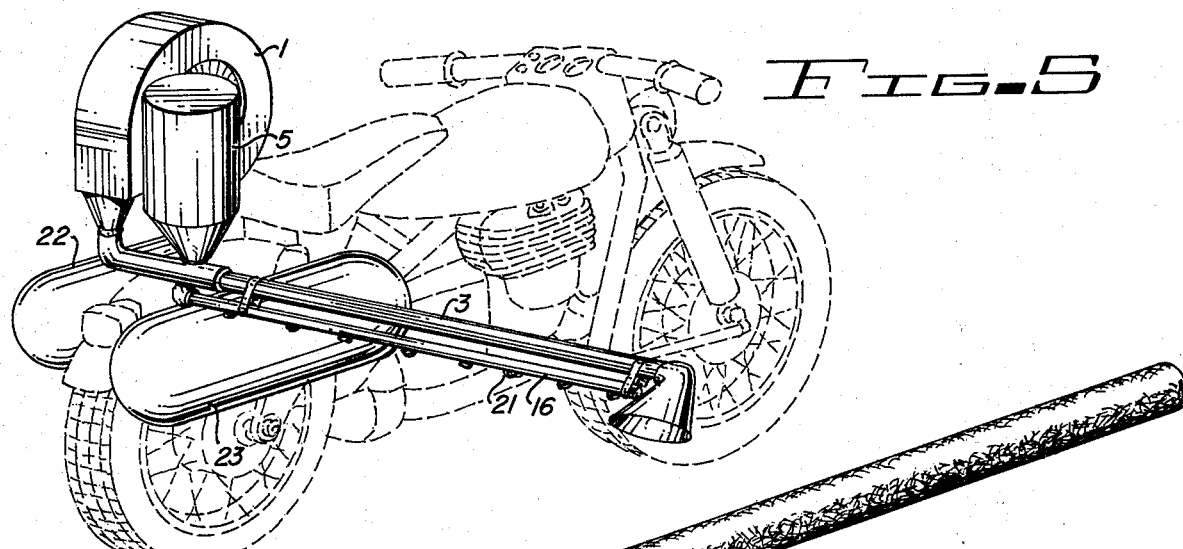
Figure 6:
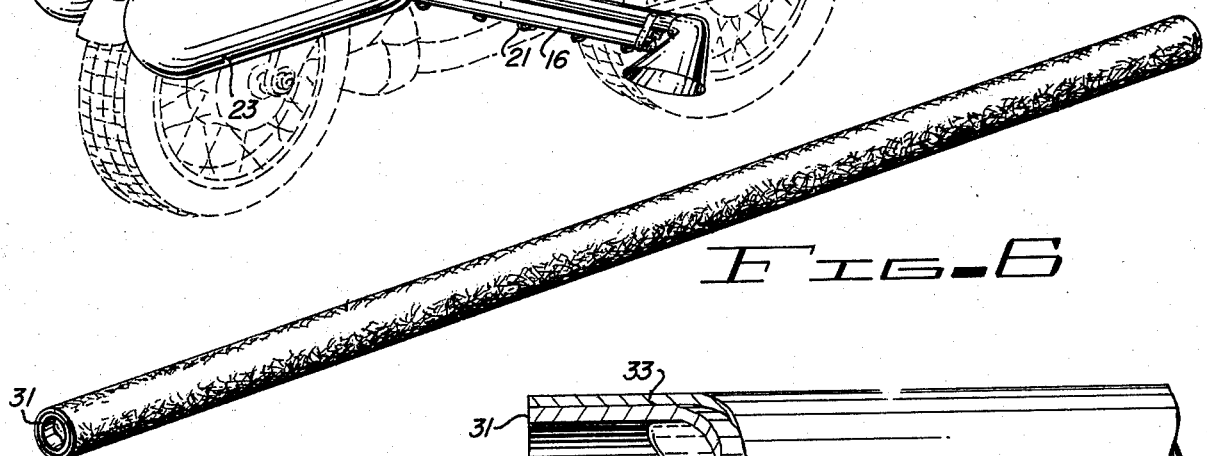
Figure 7:
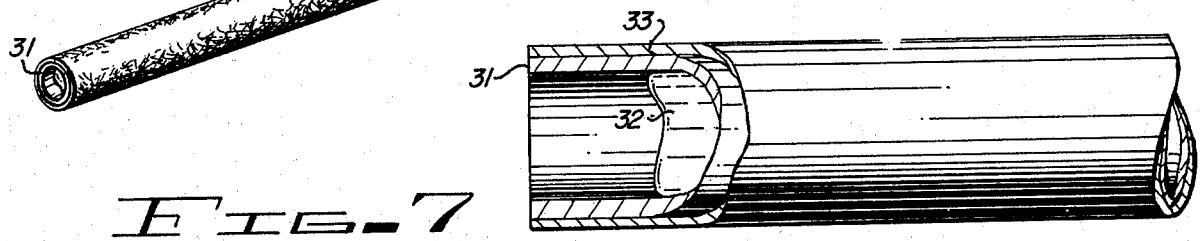
Figure 8:
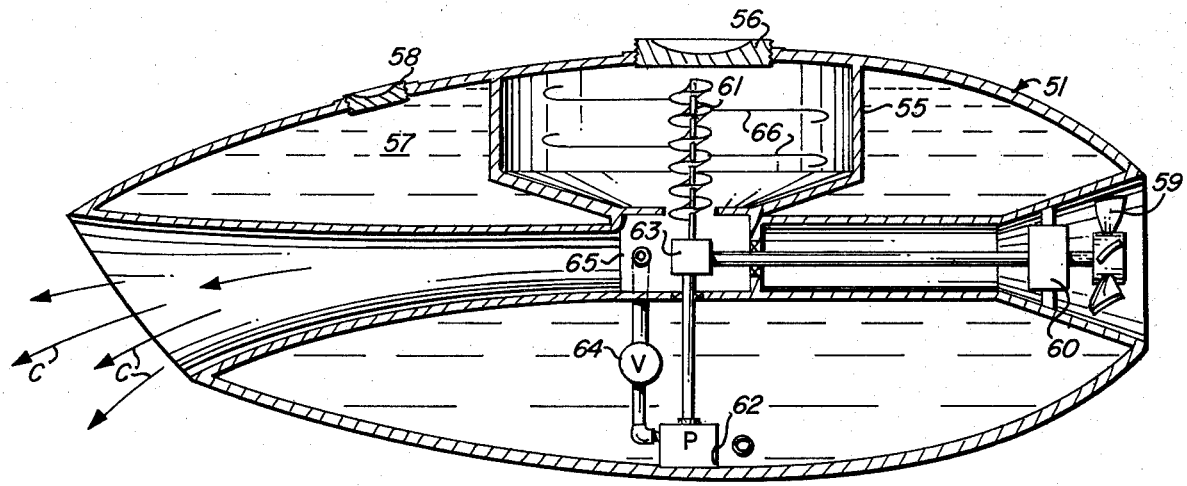
Figure 9:
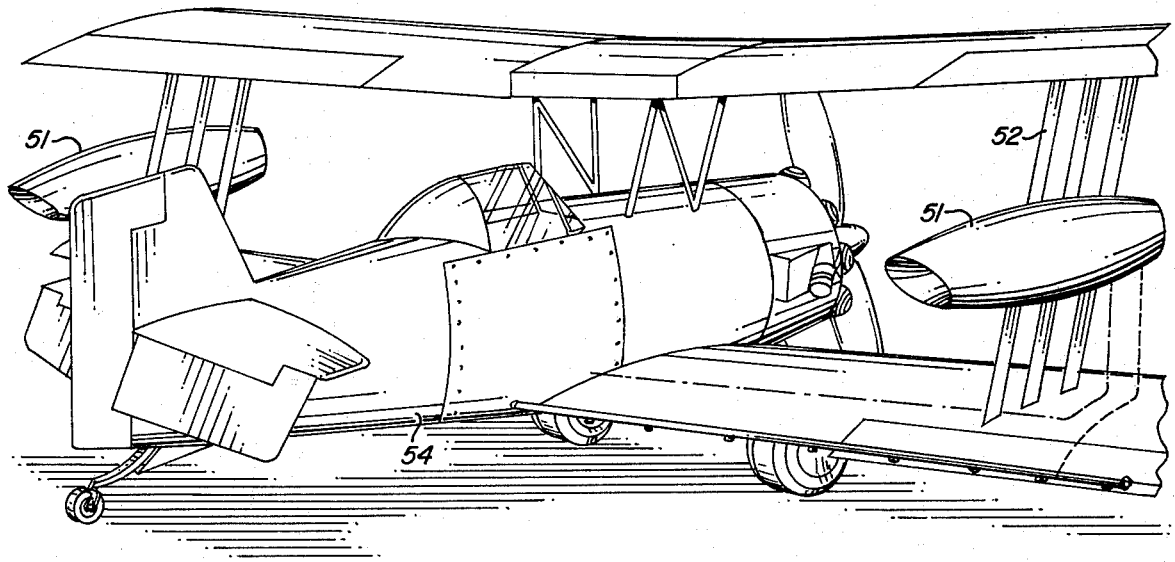

FIG. is a bottom view of the canister of FIG. 2;

FIG. 4 is a perspective view illustrating dispensing apparatus similar to that of FIG. 1 specially adapted for mounting on a field tractor;

FIG. 5 is a perspective view illustrating dispensing apparatus similar to that of FIG. 1 specially adapted for mounting on a motorcycle;

FIG. 6 is a perspective view of a filamentary conduit useful to encapsulate biologically active chemicals which can then be disseminated by the apparatus of FIGS. 1-5;

FIG. 7 is a cross-sectional view of the filamentary conduit of FIG. 6;

FIG. 8 is a cross-sectional view of another embodiment of the dispensing apparatus specially adapted for mounting on an aircraft; and FIG. 9 is a perspective view of an aircraft with the apparatus of FIG. 8 mounted thereon.

Figure 10:
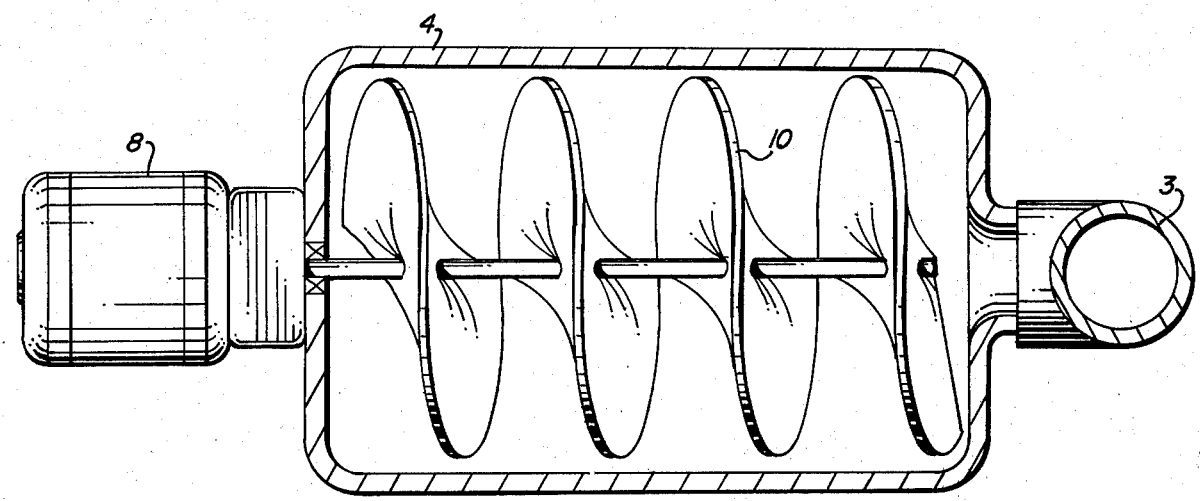
Figure 11:
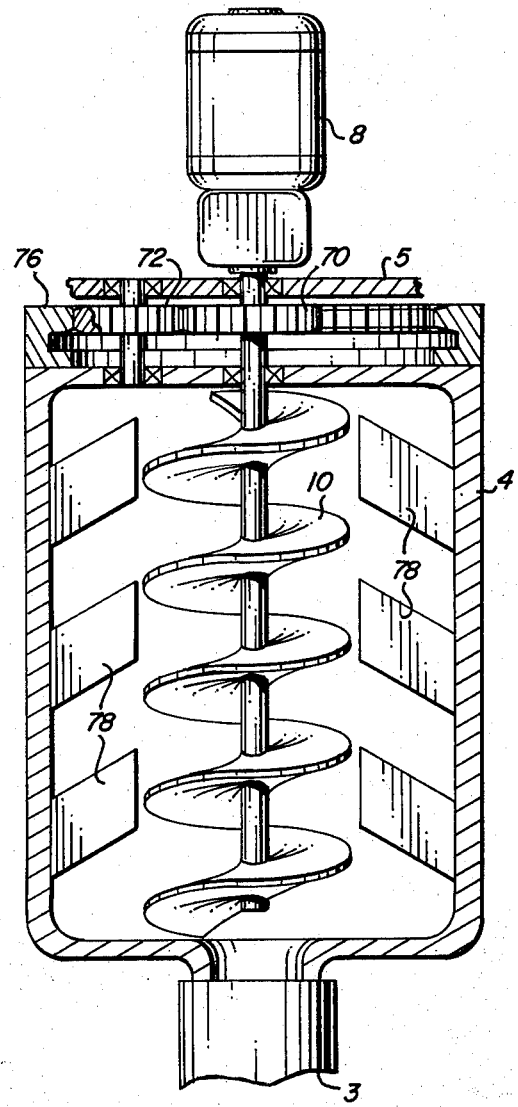

FIG. 10 is a cross sectional view of another embodiment of the canister;

FIG. 11 is a cross sectional view showing still another embodiment of the canister for use where the microdispensers present problems of sticking and packing.

Briefly, in accordance with the invention, I provide a method for broadcast dissemination of trace quantities of biologically active chemicals over a preselected area which includes the steps of encapsulating the biologically active chemical in a plurality of microdispensers, metering the microdispensers into a moving carrier fluid stream and dispensing the carrier fluid, with the microdispensers suspended therein, throughout the preselected area.

In a further embodiment of the invention, the method includes the additional step of coating the outer surfaces of the microdispensers with a second material by injecting the second material in liquid form into the moving carrier fluid stream prior to the dispensing step. The second material can be a biologically active material or a sticker substance adapted to facilitate attachment of the microdispensers to living organisms. According to the presently preferred embodiment of the invention, the microdispenser is a filamentary conduit of regulated cross-section and length although the microdispenser can take various forms.

The biologically active chemical is encapsulated for use in accordance with the method of the invention by any of several convenient techniques known to persons skilled in the art. For example, the chemical can be encapsulated within a permeable integement according to the general technique described in U.S. Pat. No. 3,539,465 and U.S. Pat. No. 3,577,515, or within zero-order release devices of the general type disclosed in U.S. Pat. No. 3,851,648. The biologically active chemical can also be contained or encapsulated in a laminated microdispenser such as the material known as "HERCON" which contains a porous chemical containing layer between two outer laminae.

Alternatively, and in accordance with the presently preferred embodiment of the invention, the biologically active material is encapsulated within a filamentary conduit of regulated cross-section and length. These hollow filaments are known in the art and, for example, may be made from any one of a number of natural or synthetic polymeric materials by any of the processes commonly employed in producing man-made fibers. Useful materials include polyesters, polyolefins, acrylics, modacrylics, polyamides, and so on. The selection of an appropriate material will be governed by considerations of chemical compatibility or inertness of the fiber material with the chemical agent or formulation to be incorporated in and released from the hollow filament. Where broadcast dissemination of the hollow filaments is contemplated, such as when employing the "confusion" technique, environmental considerations might dictate the use of a biodegradable fiber material. Regenerated protein or cellulosic fiber materials would satisfy such a requirement.

The filamentary conduits which are utilized in accordance with the presently preferred practice of the invention, for practical considerations, range in outside diameter from about 15–75 mils (1 mil = 0.001 inches) and from about 7–50 mils inside diameter, these dimensions representing preferred rather than limiting ranges. The length of the filamentary conduits will be governed primarily by the length of time desired for the release of the biologically active chemical. Thus, for a given chemical, the release rate can be controlled through the diameter of the conduits employed and the period of activity of the chemical is controlled through selection of appropriate fiber length. For example, though these dimensions are non-limiting, I employ fibers of the length in the range of about ¼—2 , inches, preferably ½-¾ inches. The specific length to be employed in a given instance will depend on the desired period of activity and the volatility of the liquid form of the active chemical.

The biologically active chemicals are loaded into the filamentary microdispensers in liquid form, i.e., as a pure compound or as a solution or suspension of the active chemical in an appropriate liquid, solvent, diluent or suspensant. The biologically active chemical, in liquid form, can then be charged into the hollow filaments by any one of several techniques. The liquid formulation will fill the hollow filament by capillary action or by gravity feed using the filament as a syphon. (In the syphon method, one end of a tube or tubes is inserted in the liquid with the other ends of the tubes below the liquid surface. A slight suction is applied to the lower ends and once the liquid flow has started, the syphon action continues until the tubes are filled. Another filling method simply involves sucking the liquid into the hollow filaments by placing the ends of the filament beneath the liquid surface and evacuating the fibers from the other ends. Another filling technique involves placing segments of the hollow filaments beneath the liquid surface and compressing them to force the air out, after which they contract and draw in the liquid. It is also possible to fill the filamentary conduits at the time they are formed by injecting the liquid as a core fluid during the spinning operation which forms the fibers. After the fibers are filled, they are then cut to appropriate length as determined by the desired period of activity.

After the microdispensers have been filled with a liquid form of the biologically active chemical, they are then ready for broadcast dissemination. The microdispensers which, in accordance with the preferred embodiment, are the filled filamentary conduits described above, are then metered into a moving carrier fluid screen, typically air, at a controlled rate and the carrier fluid with the microdispensers suspended therein is then dispensed throughout the desired area. In order to carry out these metering and dispensing operations, I have devised suitable apparatus which is generally illustrated in FIGS. 1–5 and 8–9.

Turning now to these drawings, FIGS. 1–3 illustrate one embodiment of the apparatus which I have devised for the practice of the method of the invention. This apparatus is specially adapted for dispensing the microdispensers from an aircraft such as a fixed-wing aircraft or a helicopter. The apparatus consists of a centrifugal blower fan 1 which forces air from the discharge 2 thereof into an elongate conduit 3 extending transversely of the aircraft. The filled microdispensers are contained within a replacable canister 4 which is slidably received within a housing 5 and positioned therein by the mating surfaces of a pair of guide shoulders 5' and a guide slot 6 and by the key 7 on the lower end of the shaft of a variable speed electric motor 8 which is engaged with a slotted drive key receiver 9 fixed to the upper end of a feed auger 10 journalled within the canister 4. A key guide 9' is provided on top of the canister 4 to facilitate aligning the canister 4 when it is inserted in the housing 5 such that the key 7 properly seats within the key receiver 9. The lower end of the canister 4 is provided with a discharge aperture 11 which is controlled by slide valve 12 provided with a mating aperture 13. A venturi, generally indicated by reference character 15, is carried on each of the outer ends of the conduit 3 (only one of the venturies is shown in the drawing). Air, entering the venturi in the direction of the arrow A, mixes with air containing the microdispensers suspended therein received from the blower 2 and the microdispenser feeders 5, the resulting mixture of air and microdispensers suspended therein being ejected from the venturi in the direction of the arrow B to dispense the mixture over a preselected area of the ground.

In an optional and alternate preferred embodiment of the invention which will be explained in more detail below, a second liquid which can be either a biologically active chemical, a sticker or the like is injected into the air-microdispenser mixture by injecting it through a conduit 16 located at the throat of the venturi 15. The conduit 16 provides a source of the second liquid under pressure from a tank within the fuselage of the aircraft (not shown).

FIG. 4 illustrates the adaptation of a field tractor for use in accordance with the invention and shows the location of the blower 1, the microdispenser feeders 5 and the transverse conduit 3. Instead of the venturi device at the ends of the conduit 3, nozzles 21 are provided to disseminate the mixed air-microdispenser stream. An optional second chemical is dispensed from a tank 22 which is pressurized by air stored in a tank 23 through a secondary conduit 16 connected to the nozzles 21.

FIG. 5 illustrates apparatus similar to FIG. 4 mounted on a motorcycle, with like reference characters identifying the same elements as in FIG. 4.

FIGS. 6 and 7 depict an elongate filamentary conduit 31 containing a biologically active chemical in liquid form 32 and an optional coating of a second material 33 which may be another biologically active chemical or which may function as a sticker in accordance with art-recognized techniques.

FIGS. 8 and 9 illustrate yet another embodiment of the apparatus of the invention specially adapted for disseminating trace quantities of biologically active materials from an aircraft. The apparatus consists of a pair of nacelles 51 mounted on the wing struts 52 of the crop spraying aircraft 54. The nacelles 51 enclose a hopper 55 for storing the microdispenser provided with a hopper fill cap 56. An annularly extending tank 57 provided with a fill cap 58 is provided for holding the optional second chemical. A wind turbine 59 provided with a centrifugal governor 60 drives the microdispenser feed auger 61 and a submersible pump 62 through a common gear box 63. A valve 64 controllable by the pilot provides for metering the optional second fluid contained in the tank 57 from the tank 62 into the throat of a venturi section 65 while, simultaneously, microdispensers from the hopper 55 are fed into the throat of the venturi 65. Air flowing from the venturi outlet in the direction of the arrows C entrains the microdispensers coated with the second fluid for discharge onto the terrain below.

As will be noted from FIGS. 2 and 8, the feed auger is preferably provided with auxiliary finger members 66 extending radially outwardly from the auger to insure that the microdispensers are properly agitated to prevent packing, thus assuring a steady feed rate of the microdispensers into the moving fluid stream.

In some instances, due to operation at elevated temperatures, usually above 110 degrees Fahrenheit ambient or due to moisture entrained in the microdispensers, sticking becomes a particularly serious problem. In those instances the embodiment of the apparatus shown in FIG. 10 can be utilized to insure steady feed rates. The arrangement is generally as has been described with reference to previous figures. Blower 1 communicates with the transverse conduit 3. However, the housing 5 and the microdispenser canister is positioned in a generally horizontal orientation. The replaceable canisters 4 contain an auger 10 which is driven by electric motor 8. The diameter of the flights of auger 10 closely corresponds to the interior diameter of canister 4. Thus, the auger will remove any material it tends to settle along the interior wall of the canister conveying it to the discharge of the canister.

FIG. 11 shows still another embodiment for use in instances where the microdispensers present particular problems of sticking and packing. As has been explained with reference to previous embodiments, the canister 4 contains an auger 10 which is driven by an electric motor 8. The output shaft of electric motor 8 carries a gear 70. Another gear 72 is carried on a subshaft secured to the cover of housing 5. The top of canister 4 carries an internal-toothed ring gear 76. Gears 70, 72 and 76 are engaged so that rotation of the motor shaft will cause the canister 4 to be rotated in a direction opposite to the auger. The inner side walls of the canister 4 are further provided with peripheral vanes or fins 78 which are upwardly inclined and which tend to deflect material onto the auger flights. It will be appreciated that the rotation of the vanes coupled with the directionally opposite rotation of the auger will tend to dislodge any of the contents of the canister which might otherwise stick.

In accordance with the foregoing the canister 4 may be provided with a filler cap to permit refilling at the use site. However, it is contemplated that the canister 4 will be supplied to the ultimate user as a factory sealed unit which can be simply inserted into the housing 5. When the contents of the canister 4 are completely used, the canister is removed and a fresh one inserted. The empty canister can be discarded or in some instances returned to the factory for proper refilling. This latter method reduces the handling of chemicals by the user and eliminates contamination problems.

It will be obvious to those skilled in the art to make various changes, alterations and modifications to the invention described herein. To the extent that these changes, alterations and modifications do not depart from the spirit and scope of the appended claims, they are intended to be emcompassed therein.

I claim:
1. A method for broadcast dissemination of trace quantities of biologically active chemicals over a preselected area, comprising:
   a. encapsulating said biologically active chemical in a plurality of microdispensers, each of said microdispensers being a filamentary conduit of regulated cross-section and length;
   b. metering said microdispensers into a moving carrier fluid stream; and
   c. dispensing said carrier fluid, with said microdispensers suspended therein, throughout said area.

2. Method of claim 1 including the additional step of coating the outer surfaces of said microdispensers with a second material by injecting said second material in liquid form into said moving carrier fluid stream prior to the dispensing step.

3. Method of claim 2 in which said second material is a biologically active chemical.

4. Method of claim 2 which said second material is a sticker adapted to facilitate attachment of said microdispensers to living organisms.

5. The method of claim 1 in which said microdispenser is a hollow filamentary conduit.

* * * * *